(12) United States Patent
Dabak et al.

(10) Patent No.: US 8,867,629 B2
(45) Date of Patent: Oct. 21, 2014

(54) POWER LINE COMMUNICATIONS DURING SELECTED TIME INTERVALS

(75) Inventors: Anand G. Dabak, Plano, TX (US); Gang Xu, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 151 days.

(21) Appl. No.: 13/442,248

(22) Filed: Apr. 9, 2012

(65) Prior Publication Data
US 2012/0257682 A1 Oct. 11, 2012

Related U.S. Application Data

(60) Provisional application No. 61/473,291, filed on Apr. 8, 2011.

(51) Int. Cl.
*H04B 3/00* (2006.01)
*H04B 3/54* (2006.01)

(52) U.S. Cl.
CPC ............ *H04B 3/54* (2013.01); *H04B 2203/542* (2013.01)
USPC ............ 375/257; 375/224; 375/225; 375/295

(58) Field of Classification Search
CPC ............... H04B 3/54; H04B 2203/542; H04B 2203/5433
USPC ................... 375/224, 225, 257, 295
See application file for complete search history.

(56) References Cited

U.S. PATENT DOCUMENTS

| 4,300,126 A | 11/1981 | Gajjar | |
|---|---|---|---|
| 2006/0165047 A1* | 7/2006 | Kodama et al. | 370/350 |
| 2009/0072954 A1* | 3/2009 | Kim et al. | 340/310.13 |

* cited by examiner

*Primary Examiner* — Leon Flores
(74) *Attorney, Agent, or Firm* — Steven A. Shaw; Frederick J. Telecky, Jr.

(57) ABSTRACT

A method of power line communications includes obtaining timing information for an AC mains signal transmitted on a power line in a power line communication (PLC) system that includes at least one receiver and at least one other device connected on the power line which provides variable loading during cycles of the AC mains signal. A first loading interval within at least a first cycle of the cycles having lower loading and at least a second loading interval within said first cycle having higher loading are identified using the timing information. At least one data packet is transmitted only during the first loading interval over the power line to the receiver.

15 Claims, 3 Drawing Sheets

US 8,867,629 B2

POWER LINE COMMUNICATIONS DURING SELECTED TIME INTERVALS

CROSS REFERENCE TO RELATED APPLICATIONS

This application and the subject matter disclosed herein claims the benefit of Provisional Application Ser. No. 61/473,291 filed Apr. 8, 2011, which is herein incorporated by reference in its entirety.

FIELD

Disclosed embodiments relate generally to the field of power line communication systems, and more specifically to the timing of power line communications.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

In a PLC communications system, a carrier signal, at a carrier frequency several orders of magnitude greater than the power line frequency (60 Hz in the United States), is generally transmitted in either direction between individual locations (e.g., residence, office building, manufacturing plant) and a central facility (such as a power company substation. To assure reliable PLC communications a low average packet error rate is desired be present for the transmitted carrier to all carrier-receiving locations in the PLC system.

SUMMARY

As recognized by the Inventors hereof, a problem with using a power line communications (PLC) network as a communications medium is that the power lines are subject to noise and interference that varies during the period of the AC mains cycle, so that the level of noise and interference can vary during the cycle due to loads which receive power from the power line which can variably load the power line during the cycle. Disclosed embodiments improve reliability of PLC communications (i.e. lower the average packet error rate) by obtaining timing information for the AC mains signal transmitted on a power line in the PLC system which includes at least one receiver and at least one other device connected on the power line which provides variable loading during a period of said AC mains signal. Using the timing information, a first loading interval within the cycle having lower loading (i.e. the high impedance times) and at least a second loading interval within the cycle having higher loading (i.e. the low impedance times) are identified. At least one data packet is transmitted only during the first loading interval over the power line to the receiver. The timing information can include zero crossing information.

BRIEF DESCRIPTION OF THE DRAWINGS

Reference will now be made to the accompanying drawings, which are not necessarily drawn to scale, wherein.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents.

Figure 1A:
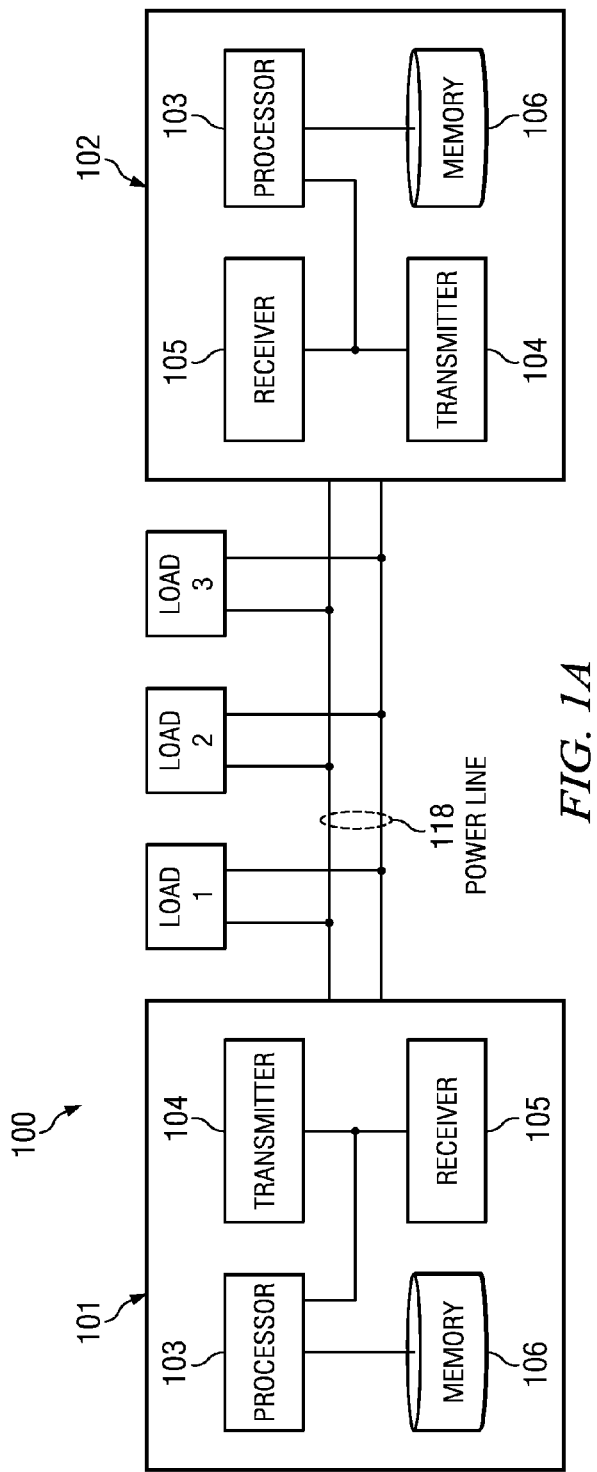
FIG. 1A is a block diagram of a PLC system generally suitable for implementing disclosed embodiments.

FIG. 1A is a block diagram of a PLC system 100 for implementing disclosed embodiments. Devices 101 and 102 communicate via uplink and downlink channels that propagate over the power line 118 shown, which includes loads shown as Load 1, Load 2 and Load 3 powered by the power line 118. Not shown is a power supply (e.g., a supply which provides 120 or 240 VAC), step down transformer and a coupling to the power line 118 which provides AC power to the power line 118, such as a 24 VAC level on the power line 118 in one particular embodiment.

Devices 101 and 102 comprise a processor 103 for processing signals to be transmitted to other devices on power line 118 via transmitters 104 and for processing signals received from other devices on power line 118 via receivers 105. As recognized by disclosed embodiments, Loads 1-3 affect both uplink and downlink channel characteristics on the power line 118, and the loading effect can vary during the cycle of the AC mains signal.

For example, device 101 may be a PLC modem so that devices 101 and 102 are peers, or a base node, concentrator, or other device that so that device 101 acts as the master of the network or communication technology in a PLC network. Device 102 may be a PLC modem, meter, or other device that may benefit or need to exchange data with the base node, including, for example, a home area network, access point, base station, picocell/femtocell, electric vehicle charging station, or the like. The communication signals propagated along the power line 118 may be OFDM signals that comply with the G.hnem, PRIME (Powerline Related Intelligent Metering Evolution), or G3 standards.

Processors 103 may be a software, firmware, or hardware based component, or a combination thereof. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. Processors 103 may also control the modulation of transmitted signals between the devices 101, 102.

Memories 106 may be used to store signals and symbols to be transmitted, received signals and symbols, modulation schemes, and computer program instructions, software and firmware used by processors 103, and any other parameters needed in the course of communications. The memories 106 may be configured to store program instructions executable by the processor 103 to cause the system to execute one or more operations disclosed herein. It will be understood that memory 106 may be any applicable storage device, such as a fixed or removable RAM, ROM, flash memory, or disc drive that is separate from or integral to processor 103. It will be understood that the devices 101 and 102 in FIG. 1A are presented for illustrative purposes only and are not intended to limit the scope of the systems or devices that are capable of employing the structures described herein.

Figure 1B:
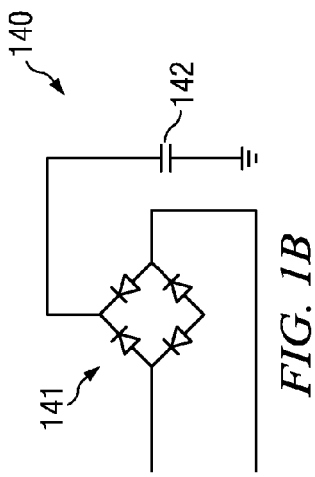
FIG. 1B is a simplified circuit representation of an example power line load shown as a proportional actuator comprising a voltage regulator and a capacitor.

FIG. 1B is a simplified circuit representation of an example power line load shown as a proportional actuator 140 comprising a voltage regulator 141 and a capacitor 142. The voltage regulator 141 is in parallel to the capacitor 142 that is connected to ground.

Voltage regulator 141 is shown as a full bridge rectifier comprising 4 diodes which is operable to provide the same polarity of output for either polarity of power input. With the capacitor 142 connected directly to the voltage regulator 141 as shown, current flows to ground through capacitor 142 in only the portion of each cycle where the amplitude of the signal across the full bridge rectifier is sufficient to overcome the voltage drop across the series connected diodes shown in each path. This cycle portion when current flows corresponds to the first loading interval described above when the voltage regulator 141 conducts current to charge the capacitor. When the voltage regulator 141 does not conduct current so that the capacitor 142 is not being charged corresponds to the second loading interval described above.

Figure 2:
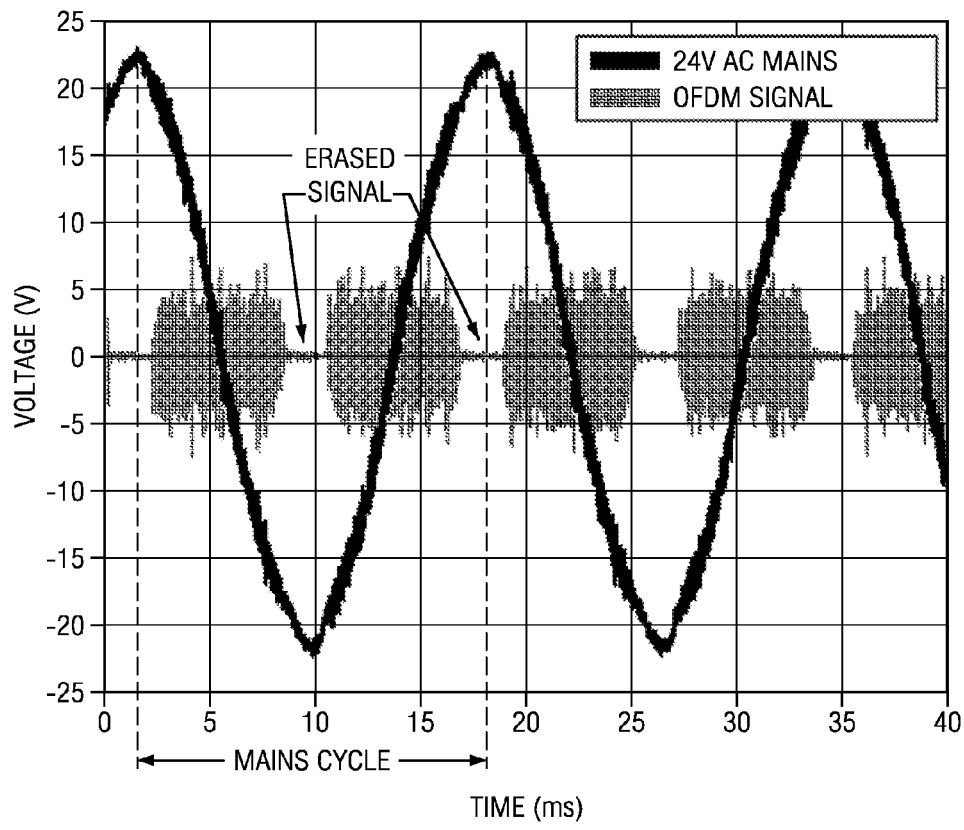
FIG. 2 depicts an orthogonal frequency-division multiplexing (OFDM) signal as well as a 24V AC mains signal from a 24V transformer at the receiver stage as a function of time when three actuators are in hold mode in a PLC system analogous to the PLC system shown in FIG. 1A, according to an example embodiment.

FIG. 2 depicts an input OFDM signal as well as a 24V AC mains from a 24V transformer at the receiver stage as a function of time when three actuators 140 are in hold mode in a PLC system analogous to system 100. At the transmitter, such as device 101, the OFDM signal is transmitted back-to-back. It can be seen that around the 24VAC mains hitting its positive and negative peaks, and the OFDM signals are erased creating what is referred to herein as "deadtime" because of the low impedance occurring on the channel due to the capacitor 142 and the voltage regulator (e.g., diode bridge) 141 in the actuator 140. One mains cycle is identified which is shown from about t=2 msec to about t=18 msec.

Deadtime can be seen to be from about 8 msec to 11 msec, and from 17 msec to 19 sec, being about 2 to 3 msec in duration, and also being periodic with the mains cycle. Disclosed embodiments transmit during the high impedance times, such as during the mains cycle shown between about 3 msec and 8 msec and between 11 msec and 16 msec, and can use zero crossing information during the mains cycles to implement communications. Zero crossing information is available on some commercially available modems including PLC modems. Thus, disclosed embodiments allow transmitting OFDM signals or other modulated signals with smaller symbol time (period) during the good signal periods (avoiding deadtime transmissions), such a based on zero crossing information.

It has been found the more actuators are on the power line that are in active mode, the more the signal is erased, which corresponds to an increased deadtime. Moreover, as the number of actuators on the power line increases, the erased time/deadtime time also increases.

For example, in a particular embodiment, using a carrier spacing 4.6875 kHz reduces the symbol period. In one particular embodiment, the packet includes 10 symbols of preamble, 13 symbols for header and 30 data symbols, and can use BPSK, QPSK, or 8 PSK modulation. Using a signal bandwidth from 23.438 kHz to 131.25 kHz (24 tones), achieved estimated data rates are: BPSK–(24*30*0.5*0.6)/(1/60)=12.96 Kbps, QPSK–2*(24*30*0.5*0.6)/(1/60)= 25.92 Kbps AND 8PSK–3*(24*30*0.5*0.6)/(1/60)=38.88 Kbps. In another particular embodiment, again using a carrier spacing 4.6875 kHz, the packet includes 13 symbols of preamble, 10 symbols for header and 30 data symbols using BPSK, QPSK, 8 PSK modulation leads to a total time=53/4.6875=11.3067 ms. A signal bandwidth can be used from 23.438 kHz to 187.5 kHz (36 tones). Achieved estimated data rates in this embodiment are BPSK–(36*30*0.5*0.6)/(1/60)= 19.44 Kbps, QPSK–2*(36*30*0.5*0.6)/(1/60)=38.88 Kbps, and 8PSK–3*(36*30*0.5*0.6)/(1/60)=58.32 Kbps.

Disclosed embodiments include adaptive deadtime, where the transmitter estimates the average packet errors that are occurring at a given time and changes the packet duration in response. Based on the number of packet errors or estimated number of errors, the transmitter can adjust the packet size so that the packet transmission can occur only during the cycle intervals when the load(s), such as actuator(s), is not drawing current resulting in good performance (e.g., a low packet error rate). Thus, for a single actuator in hold mode, the transmitter can transmit for ~15 msec (47 data symbols) giving estimated data rates of BPSK–(47*30*0.5*0.6)/(1/60)=25.38 Kbps, QPSK–2*(47*30*0.5*0.6)/(1/60)=50.76 Kbps, and 8PSK–3*(47*30*0.5*0.6)/(1/60)=76.14 Kbps.

Figure 3:
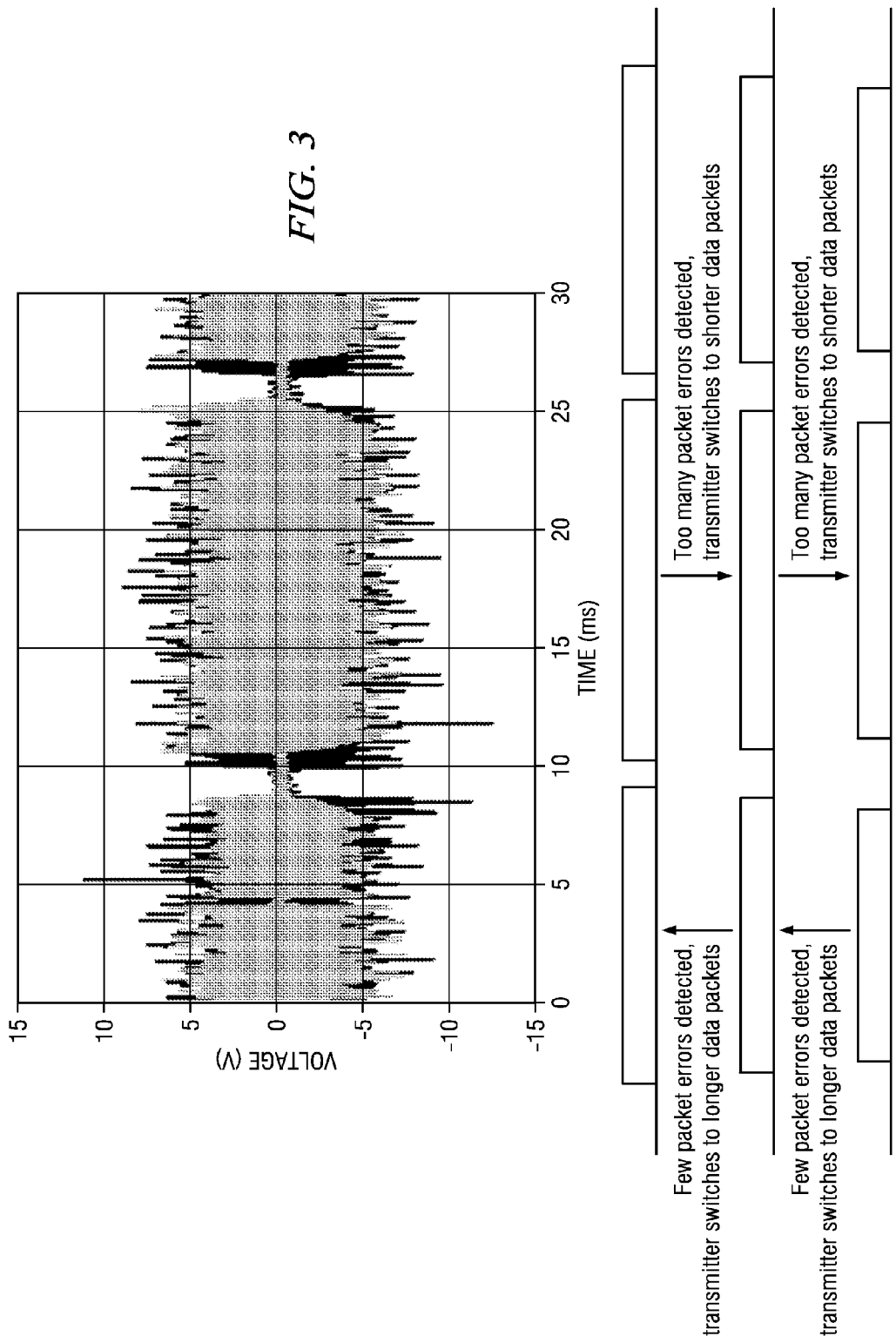
FIG. 3 depicts an OFDM signal on the power line with a single actuator on the power line in both hold and active mode while operating in a system analogous to the PLC system shown in FIG. 1A, according to an example embodiment.

FIG. 3 depicts an OFDM signal on the power line with a single actuator on the power line in both hold and active mode while operating in a PLC system analogous to the system shown in FIG. 1A, according to an example embodiment. Rectangular blocks are shown under the waveforms provided that each represent data packets. It can be seen the data packets are transmitted in cycle intervals that avoid the deadtimes. The estimated number of packet errors can be obtained from receiver feedback. In this adaptive deadtime embodiment, when fewer packet errors detected, the transmitter switches to longer duration data packets, and when more packet errors are detected, the transmitter can switch to shorter duration data packets. In one embodiment a predetermined error rate threshold is used to control the data packet length switching.

Figure 4:
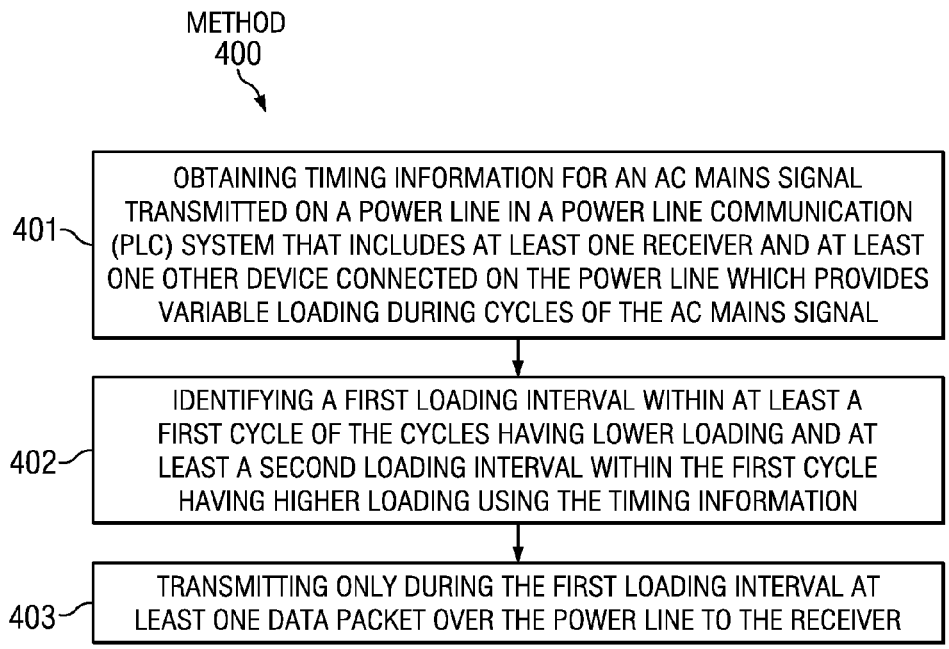
FIG. 4 is a flow chart that shows steps in an example method of power line communications, according to an example embodiment.

FIG. 4 is a flow chart that shows steps in an example method 400 of power line communications, according to an example embodiment. Step 401 comprises obtaining timing information for an AC mains signal transmitted on a power line in a PLC system that includes at least one receiver and at least one other device connected on the power line which provides variable loading during cycles of the AC mains signal. Step 402 comprises identifying a first loading interval within at least a first cycle of the cycles having lower loading (i.e. the high impedance times) and at least a second loading interval within the first cycle having higher loading (i.e. the low impedance times) using the timing information. In step 403 data packets are transmitted over the power line only during the first loading interval to the receiver. The data packet can be part of a whole (entire) packet transmitted during the first loading interval.

Disclosed methods can include adaptively determining a length of the data packets based on a number of errors detected on said power line for at least one previous communication over the power line to the receiver. In this embodiment, the receiver can provides feedback to a transmitter used for the transmitting which includes the number of errors or an estimated number of errors. The transmitter can switch to longer data packets when the number of errors or estimated number of errors is below a predetermined threshold, and switch to shorter data packets when the number of errors or estimated number errors is above the predetermined threshold. The timing information can includes zero crossing information for the AC mains signal.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method of power line communications, comprising:
   obtaining timing information for an AC mains signal transmitted on a power line in a power line communication (PLC) system that includes at least one receiver and at least one other device connected on said power line which provides variable loading during cycles of said AC mains signal, wherein said other device comprises a voltage regulator coupled to said power line which is in parallel to a capacitor that is connected to ground, and wherein said voltage regulator conducts current to charge said capacitor during said first loading interval, and wherein said voltage regulator does not conduct current so that said capacitor is not charged during said second loading interval;
   identifying a first loading interval within at least a first cycle of said cycles having lower loading and at least a second loading interval within said first cycle having higher loading using said timing information; and
   transmitting only during the first loading interval at least one data packet over said power line to said receiver.

2. The method of claim 1, wherein said voltage regulator comprises a diode bridge.

3. The method of claim 1, wherein said at least one data packet is part of a whole packet transmitted during said first loading interval.

4. The method of claim 1, wherein said timing information includes zero crossing information for said AC mains signal.

5. A power line communication (PLC) device, comprising:
   a transmitter;
   a processor, and
   a memory coupled to said processor,
   wherein said memory is configured to store program instructions executable by said processor to cause said PLC device to:
      obtain timing information for an AC mains signal transmitted on a power line in a power line communication (PLC) system that includes at least one other device connected on said power line which provides variable loading during cycles of said AC mains signal, wherein said other device comprises a voltage regulator coupled to said power line which is in parallel to a capacitor that is connected to ground, and wherein said voltage regulator conducts current to charge said capacitor during said first loading interval, and wherein said voltage regulator does not conduct current so that said capacitor is not charged during said second loading interval;
      identify, using said timing information, a first loading interval having lower loading and at least a second loading interval having higher loading within at least a first cycle of an AC mains signal transmitted on the power line; and
      transmit, using the transmitter, only during the first loading interval at least one data packet over said power line.

6. The PLC device of claim 5, wherein said processor comprises a digital signal processor (DSP).

7. The PLC device of claim 5, wherein the PLC device includes a PLC modem.

8. The PLC device of claim 5, wherein said another PLC device provides feedback which includes said number of errors or an estimate of said number of errors to said PLC device.

9. The PLC device of claim 5, wherein said PLC device switches to longer ones of said data packets when said number of errors or said estimated number of said errors is below a predetermined threshold, and switches to shorter ones of said data packets when said number of errors or said estimated number of said errors is above said predetermined threshold.

10. The PLC device of claim 5, wherein timing information including zero crossing information for said AC mains signal is used by said PLC device to identify said first and said second loading interval.

11. The method of claim 5, wherein said at least one data packet is part of a whole packet transmitted during said first loading interval.

12. A non-transitory tangible computer-readable storage medium having program instructions stored thereon that, upon execution by a power line communication (PLC) device, cause said PLC device to:
   obtain timing information for an AC mains signal transmitted on a power line in a power line communication (PLC) system that includes at least one other device connected on said power line which provides variable loading during cycles of said AC mains signal, wherein said other device comprises a voltage regulator coupled to said power line which is in parallel to a capacitor that is connected to ground, and wherein said voltage regulator conducts current to charge said capacitor during said first loading interval, and wherein said voltage regulator does not conduct current so that said capacitor is not charged during said second loading interval;

identify, using said timing information, a first loading interval having lower loading and at least a second loading interval having higher loading within at least a first cycle of an AC mains signal transmitted on the power line;

transmit only during the first loading interval at least one data packet over said power line; and adaptively change a length of said data packet based on a number of errors or an estimate of said number of errors on said power line for at least one previous communication over said power line.

13. The non-transitory tangible computer-readable storage medium of claim 12, wherein said program instructions cause said PLC device PLC device to switch to longer ones of said data packets when said number of errors or said estimated number of said errors is below a predetermined threshold, and switch to shorter ones of said data packets when said number of errors or said estimated number of said errors is above said predetermined threshold.

14. The non-transitory tangible computer-readable storage medium of claim 12, wherein timing information including zero crossing information for said AC mains signal is used to identify said first loading interval and said second loading interval.

15. The method of claim 12, wherein said at least one data packet is part of a whole packet transmitted during said first loading interval.

* * * * *